US006939182B1

(12) United States Patent
Wen et al.

(10) Patent No.: US 6,939,182 B1

(45) Date of Patent: Sep. 6, 2005

(54) FOOL-PROOF MECHANISM FOR MEMORY CARD

(75) Inventors: Forli Wen, Hsinchu (TW); Tony Chang, Miao-Li Hsien (TW); Tsung-Kan Cheng, Taipei (TW)

(73) Assignee: C-One Technology Corporation, Hsinchu (TW)

( * ) Notice: Subject to any disclaimer, the term of this patent is extended or adjusted under 35 U.S.C. 154(b) by 0 days.

(21) Appl. No.: 10/829,025

(22) Filed: Apr. 20, 2004

(51) Int. Cl.$^{7}$ .............................................. H01R 13/64

(52) U.S. Cl. ........................................ 439/678; 439/55

(58) Field of Search .......................... 439/55, 677, 678, 439/152, 153, 160, 60, 62; 235/492, 493, 235/486, 487; 361/752, 759, 401, 686, 683; 257/679; 345/163

(56) References Cited

U.S. PATENT DOCUMENTS 3,777,120 A * 12/1973 Menger et al. ............. 235/483
4,807,059 A * 2/1989 Talmadge et al. ............. 360/60
5,373,149 A * 12/1994 Rasmussen ................. 235/492
6,448,638 B1 * 9/2002 Fidalgo et al. .............. 257/679
6,540,560 B1 * 4/2003 Ito et al. ..................... 439/633
6,577,500 B2 * 6/2003 Paredes et al. ............. 361/686
6,666,382 B2 * 12/2003 Lisimaque et al. ......... 235/492
6,786,417 B1 * 9/2004 Kondo et al. ............... 235/492
6,809,722 B2 * 10/2004 Mei et al. ................... 345/163
6,814,294 B2 * 11/2004 Liston et al. .......... 235/472.01
6,824,066 B2 * 11/2004 Weyant ...................... 235/493
6,840,447 B2 * 1/2005 Hirata et al. ................ 235/451

* cited by examiner

*Primary Examiner*—Alexander Gilman

(57) ABSTRACT

A fool-proof mechanism for memory card is presented, in which an asymmetrically configured insertion end of a memory card is provided to ensure that no incorrect insertion of the memory card will be done; and a length or height gradient of circuit's contact produced according to an asymmetric arcuate or curved alignment of a plurality of circuit's contacts will create a contact time difference between contacts of different circuit's contacts with corresponding contact terminals for application in design of specific circuits.

3 Claims, 7 Drawing Sheets

FOOL-PROOF MECHANISM FOR MEMORY CARD

BACKGROUND OF THE INVENTION

1. Field of the Invention

The present invention relates to a fool-proof mechanism for memory card, and particularly to a fool-proof mechanism comprising an asymmetrically configured insertion end formed in a memory card for prevention of any incorrect insertion of the memory card into an associated card read/write device.

2. The Prior Arts

In order to prevent a memory card, such as Multi Media Card, Smart Media Card, and Memory Stick Card, from being incorrectly inserted into an associated card read/write (R/W) device, a fool-proof mechanism is usually provided to the memory card. The fool-proof mechanism generally includes a removed chamfer or arc portion (or a recess) at a single corner of an insertion end of the memory card as well as a corresponding protruding portion (or a protrusion) on the mated R/W device.

However, such an arrangement is defective in some respects: an unsightly appearance; difficult to aim exactly and insert a card because of a single fool-proof mechanism; and no contact time difference available when jointing symmetrically flush aligned circuit's contacts with contact terminals. Thus, there are still rooms for improvements.

SUMMARY OF THE INVENTION

A primary object of the present invention is to provide a fool-proof mechanism for memory card, in which a contact time difference between contacts of circuit's contacts with contact terminals is availed for design of specific circuits.

In order to realize foregoing object, an asymmetric insertion end is formed at the front edge of a memory card and more than a circuit's contact are asymmetrically aligned in arc or curve according to the configuration of the asymmetric insertion end so that a length difference between two sides of the memory card can be produced to avoid any reverse insertion of the asymmetric memory card. Moreover, a height difference between every two neighboring circuit contacts may be created through the asymmetric arcuate or curved alignment of the circuit contacts such that a contact time difference between contacts of circuit's contacts with contact terminals is available for design of specific circuits.

In short, the merits of the present invention may be summarized as the following:

(1) A sightly appearance of the whole body is secured in addition to the fool-proof function.

(2) Insertion of the memory card into the R/W device is smoother than ever.

(3) A contact time difference between contacts of circuit's contacts with contact terminals is available for design of specific circuits.

(4) The conventional R/W device, which has a recess-and-protrusion style fool-proof mechanism, is remained usable.

(5) The asymmetric arcuate or curved configuration of insertion end or circuit's contact may be applied widely to memory card of different species, such as Multi Media Card, Smart Media Card, and Memory Stick Card.

For more detailed information regarding advantages or features of the present invention, at least an example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
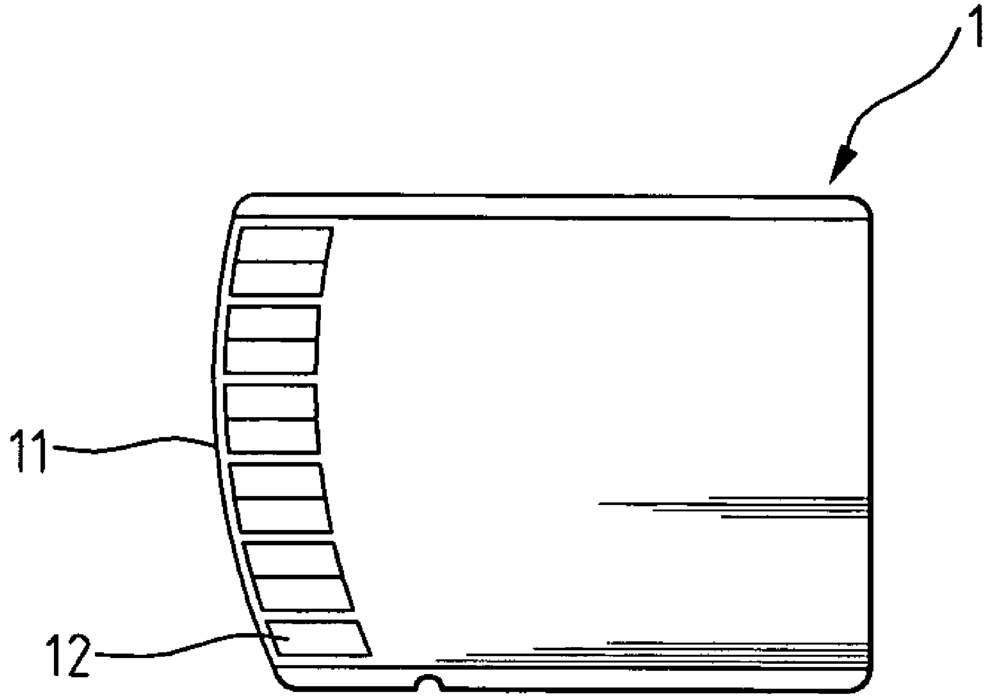
FIG. 1 is an upward view of the present invention.

FIG. 1 is an upward view of the present invention. As shown in FIG. 1, in a fool-proof mechanism for memory card, an insertion end (11) at the front edge of a memory card (1) is formed substantially in an asymmetric arcuate or curved configuration, in which a preferred formation of the insertion end (11) is a smooth curve having a higher end at one side to go down gradually towards the other. Since more than a circuit's contact (12) (quantity thereof depending on the specifications and style of the memory card) are formed on a bottom face at the front edge of the memory card (1) and a height difference between two laterals of the memory card (1) is existed because of the asymmetric arcuate or curved configuration of the insertion end (11), incorrect insertion of the memory card (1) can thus be avoided. Besides, it is possible to create a contact time difference between contacts of any two circuit's contacts (12) with corresponding contact terminals (22) for application in design of specific circuits (see also FIG. 3) by taking advantage of a height difference in a plurality of asymmetrically arc- or curve-aligned circuit's contacts (12).

Figure 2A:
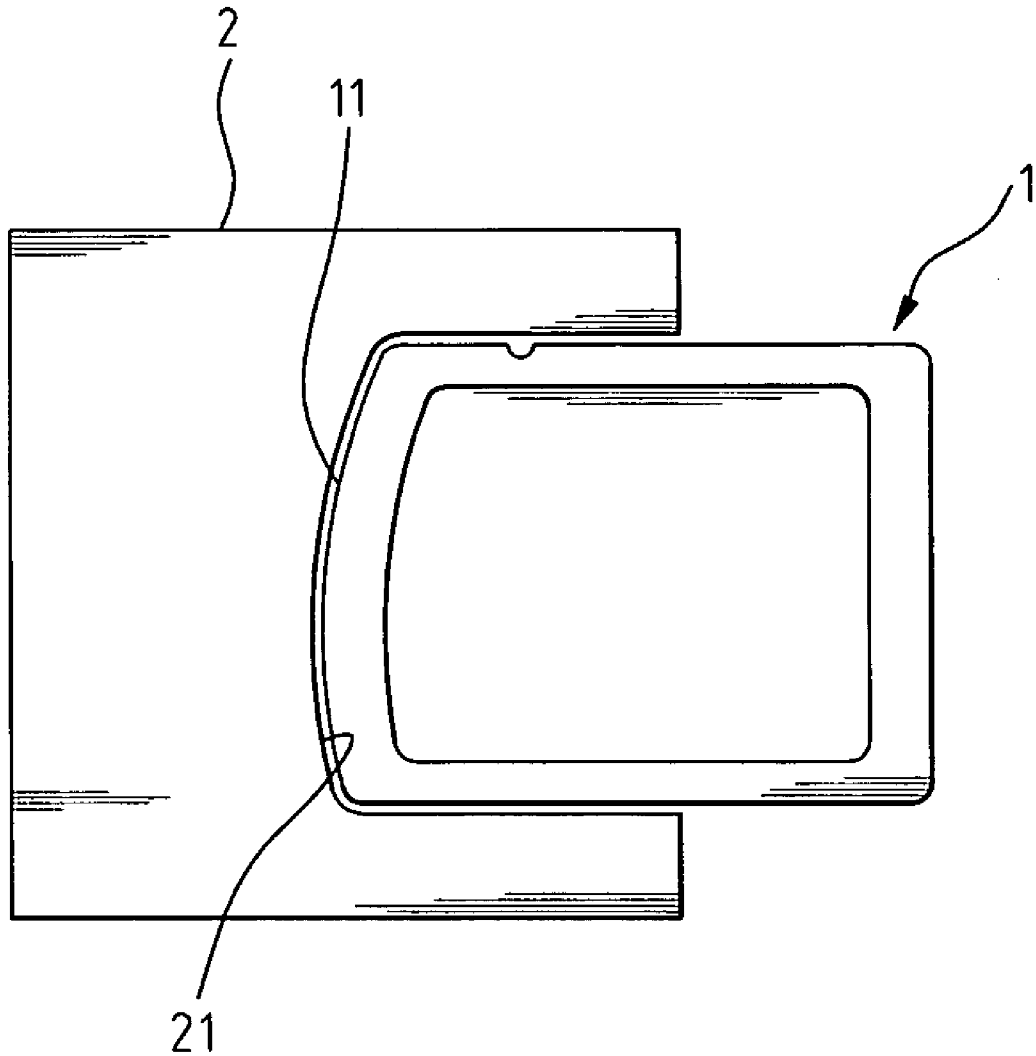
FIG. 2A is an action view (I) of the present invention.
Figure 2B:
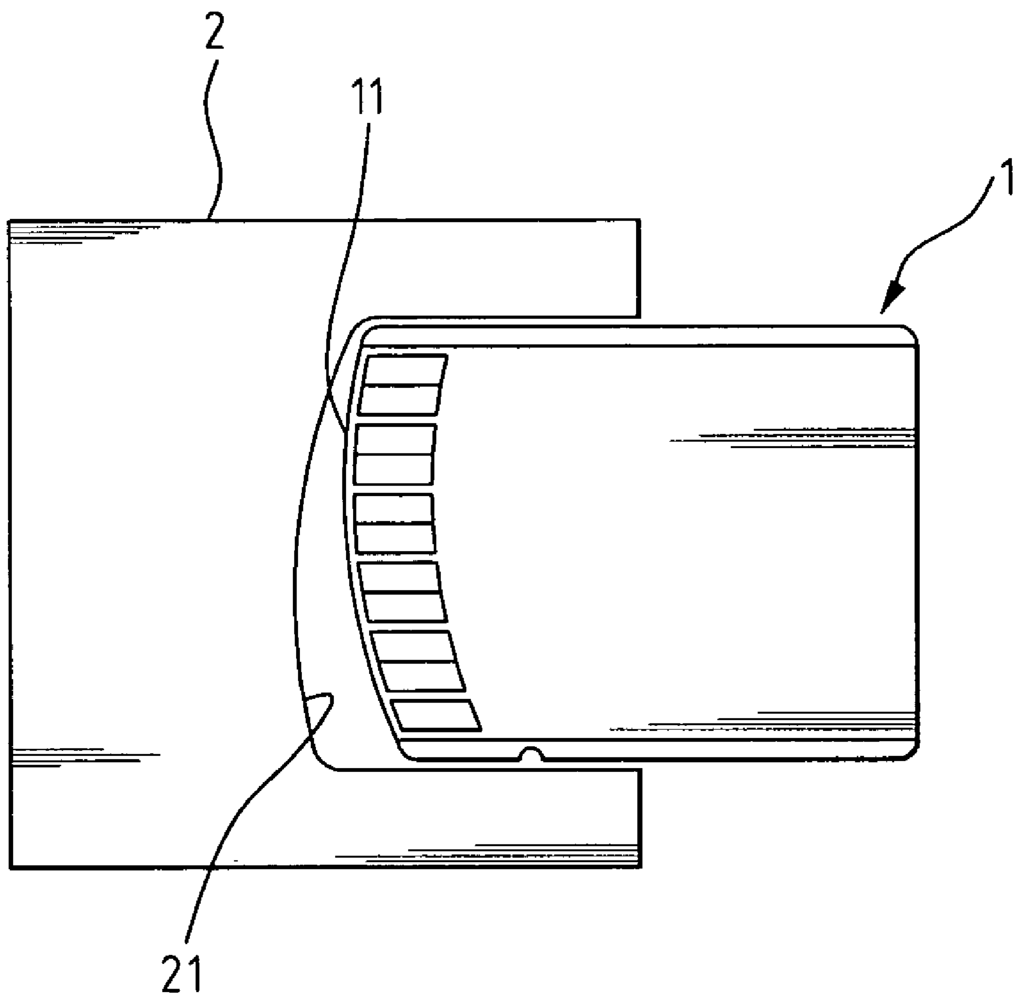
FIG. 2B is another action view (II) of the present invention showing an erroneous demonstration.
Figure 2C:
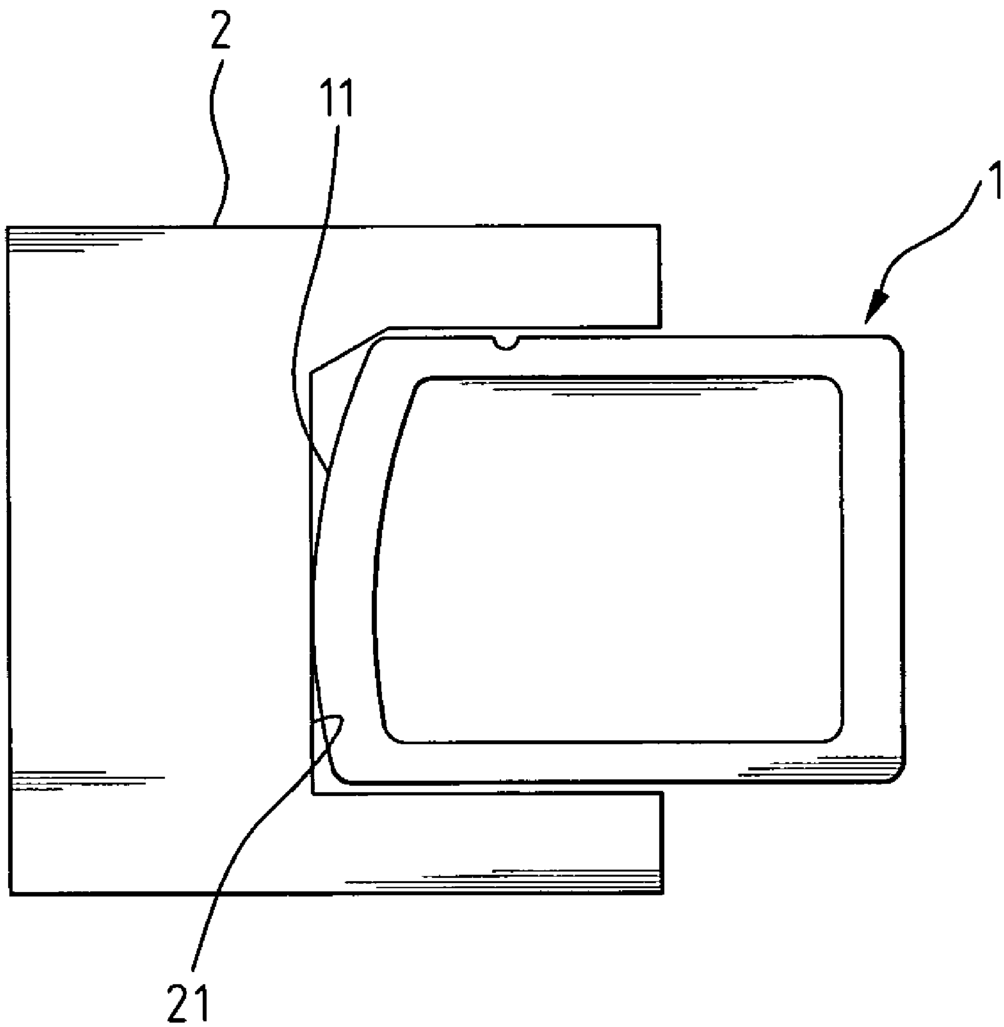
FIG. 2C is yet another action view (III) of the present invention.

Schematic views (I), (II), and (III) of the present invention are shown in FIGS. 2A through 2C. As illustrated in those drawings, an asymmetric arcuate or curved insertion end (11) at the front edge of a memory card (1) can be fully matched with a corresponding channel (21) of a Read/Write (R/W) device (2) for data reading. On the contrary, the memory card (1) could be disabled suppose the insertion end (11) is incorrectly inserted into the channel (21) of the R/W device (2) to result in an incomplete joint. In this manner, incorrect insertion of the memory card (1) can be avoided. By the way, the memory card (1) can perform data transfer or R/W operation as usual even when a conventional fool-proof mechanism is provided to the R/W device (2), if the arcuate or curved insertion end (11) of the memory card (1) is adopted (see FIG. 2C).

Figure 3:
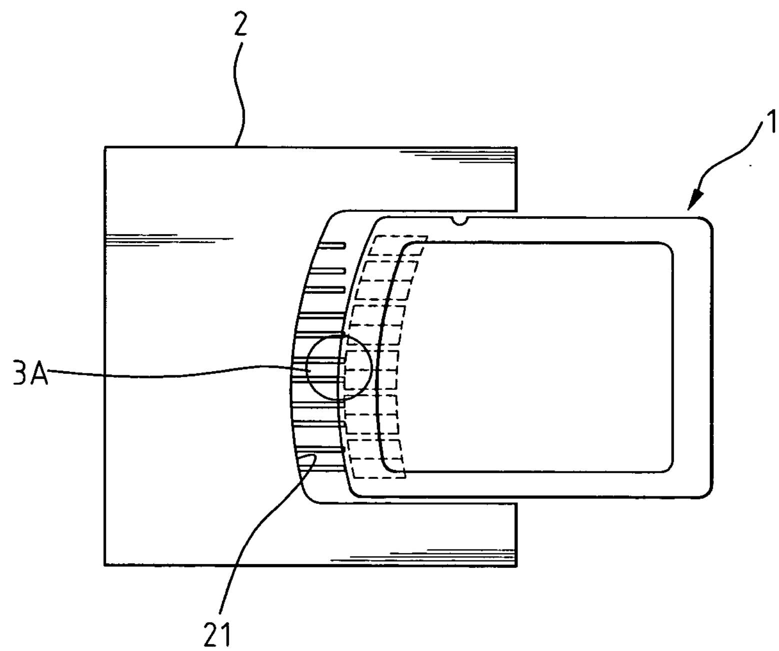
FIG. 3 is yet another action view (IV) of the present invention.
Figure 3A:
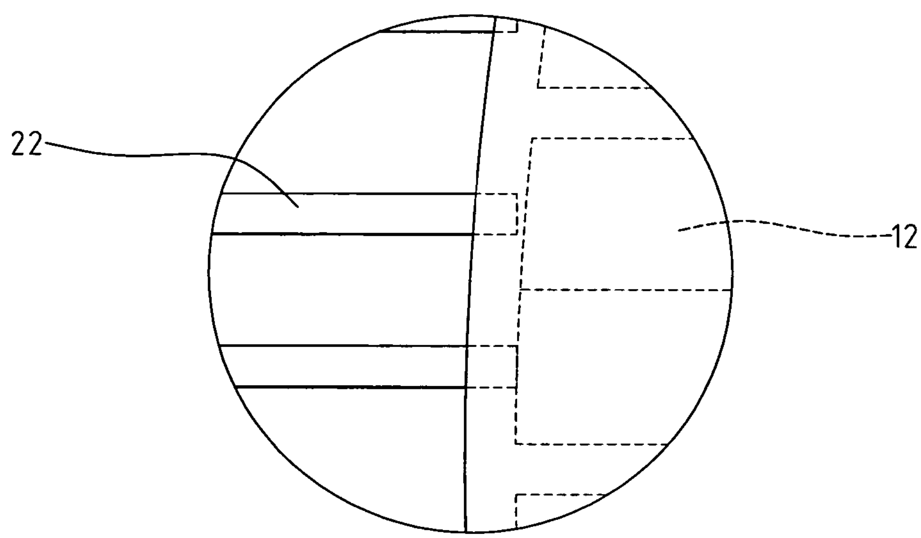
FIG. 3A is a partially enlarged view of FIG. 3.
Figure 4:
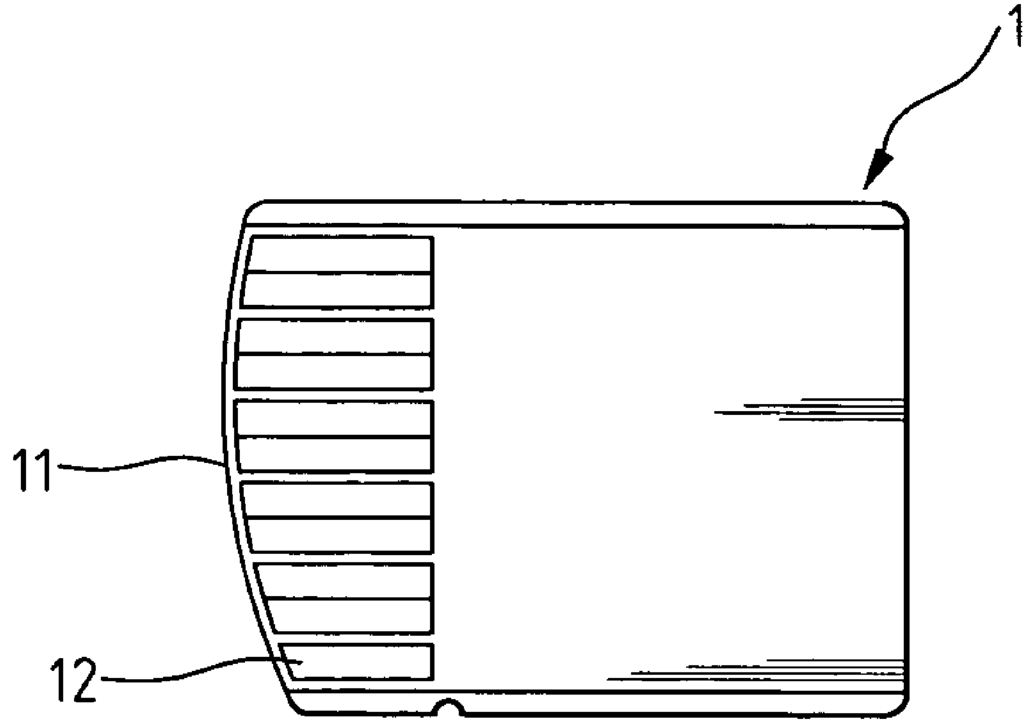
FIG. 4 shows an embodiment (a) of the present invention.
Figure 5:
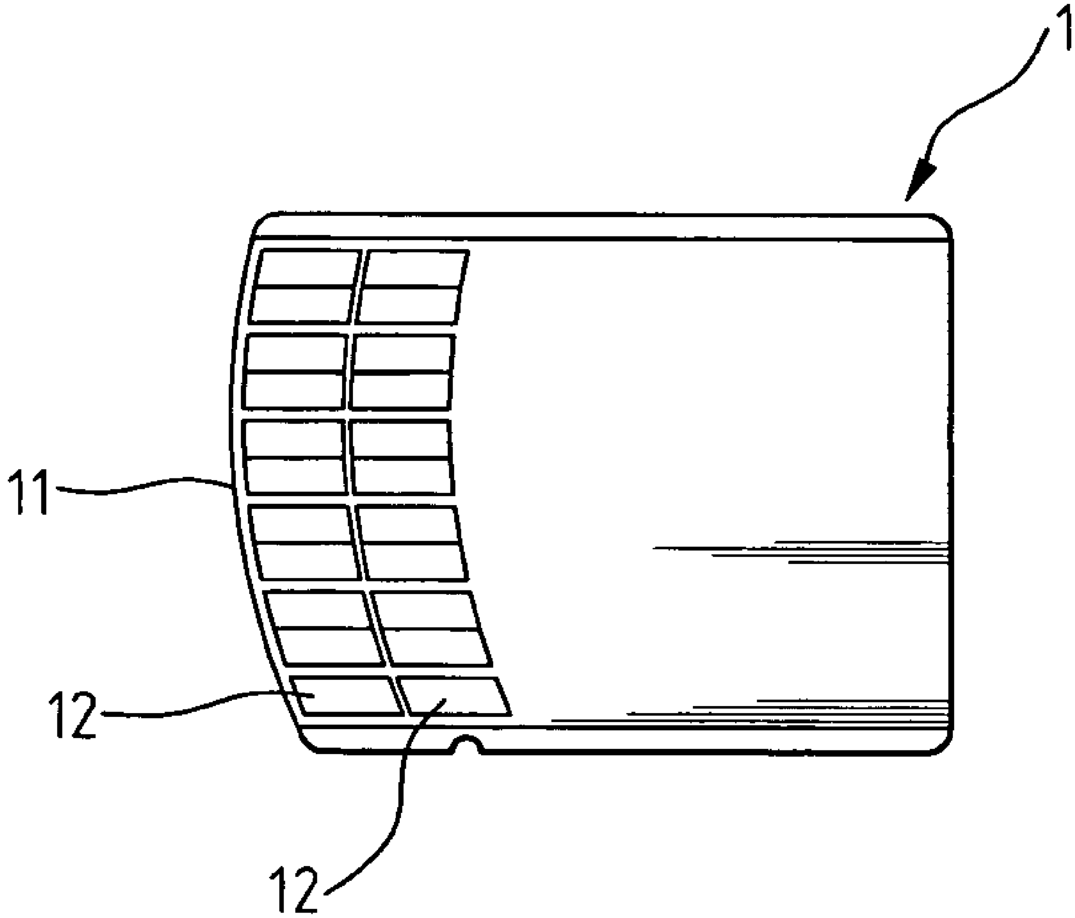
FIG. 5 shows another embodiment (b) of the present invention.

As illustrated in FIGS. 3, 4, and 5, which show an action view (IV), an embodiment (a), and another embodiment (b) of the present invention, respectively, there are more than a circuit's contact (12) asymmetrically aligned in arc or curve at the front edge of the memory card (1) according to the configuration of an insertion end (11), so that a length or height gradient of the circuit's contacts (12) is formed. At this moment when the insertion end (11) is pushed to joint with the channel (21) of the R/W device (2), a frontmost circuit's contact (12) is supposed to contact and lap-joint first with a corresponding contact terminal (22) of the R/W device (2) to provide an electrically conductive path (other circuit's contacts not yet in contact with respective corresponding contact terminals). The memory card (1) is then inserted farther to go deeper and deeper so that the rest circuit's contacts (12) will contact and lap-joint with respective contact terminals (22) one after another. By taking advantage of the length difference between neighboring circuit's contacts (12), a contact time difference could be produced for design of specific circuits (to set booting or linking the R/W device, or store data temporarily at the moment the memory card is removed, for example). Moreover, the circuit's contact (12) may be lengthened or formed in parallel if desired.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A fool-proof mechanism for memory card, in which an asymmetrically formed arcuate insertion end at the front edge of a memory card is provided to hence produce a length or height gradient in said insertion end; and more than a circuit's contact are arranged asymmetrically on the bottom face at the front edge of the memory card based on the configuration of the insertion end to hence produce a length or height difference between the circuit contacts.

2. The fool-proof mechanism according to claim 1, wherein the insertion end is an asymmetrically curved insertion end.

3. The fool-proof mechanism according to claim 1, wherein the insertion end is profiled in a smooth arc line higher on one side to go gradually down to the other.

* * * * *